United States Patent
Rule

(10) Patent No.: US 6,911,523 B2
(45) Date of Patent: Jun. 28, 2005

(54) METHOD TO DECREASE THE ALDEHYDE CONTENT OF POLYESTERS

(75) Inventor: Mark Rule, Atlanta, GA (US)

(73) Assignee: ColorMatrix Corporation, Cleveland, OH (US)

( * ) Notice: Subject to any disclaimer, the term of this patent is extended or adjusted under 35 U.S.C. 154(b) by 0 days.

(21) Appl. No.: 10/621,636

(22) Filed: Jul. 17, 2003

(65) Prior Publication Data

US 2005/0014929 A1 Jan. 20, 2005

(51) Int. Cl.$^7$ .................................................. C08F 6/00
(52) U.S. Cl. ........................ 528/480; 215/366; 220/906; 264/176.1; 428/35.7
(58) Field of Search ......................... 215/366; 220/906; 264/176.1, 219; 428/35.7, 35.8; 528/480, 193, 194, 272, 492; 502/102, 103, 150

(56) References Cited

U.S. PATENT DOCUMENTS

| | | | |
|---|---|---|---|
| 4,365,031 A | 12/1982 | Massey | |
| 4,420,581 A | 12/1983 | McFarlane | |
| 4,485,204 A | 11/1984 | Nabors | |
| 4,837,115 A | 6/1989 | Igarashi et al. | .......... 428/36.92 |
| 4,877,909 A | 10/1989 | Mizusaki et al. | ........... 568/880 |
| 4,910,177 A | 3/1990 | Matsushita et al. | ........... 502/65 |
| 5,258,233 A | 11/1993 | Mills et al. | ................. 428/480 |
| 5,340,884 A | 8/1994 | Mills et al. | ................. 125/420 |
| 5,354,915 A | 10/1994 | Reichle | ..................... 568/881 |
| 5,650,469 A | 7/1997 | Long et al. | ................. 525/425 |
| 5,846,642 A * | 12/1998 | Kimura et al. | .............. 428/323 |
| 6,075,145 A | 6/2000 | Heveling et al. | ........... 546/137 |
| 6,274,212 B1 | 8/2001 | Rule et al. | ............... 428/36.92 |
| 6,569,479 B2 | 5/2003 | Rule | .......................... 426/131 |
| 2002/0136808 A1 | 9/2002 | Rule | |
| 2002/0198307 A1 | 12/2002 | Jalan | |

FOREIGN PATENT DOCUMENTS

| | | |
|---|---|---|
| EP | 0 239 993 | 11/1984 |
| EP | 0 281 627 | 9/1988 |
| EP | 0 943 649 | 9/1999 |
| JP | 62 199648 | 2/1988 |
| JP | 04 170464 | 6/1992 |
| WO | WO 94/29378 | 12/1994 |
| WO | WO 97/28218 | 8/1997 |

* cited by examiner

*Primary Examiner*—Terressa Boykin
(74) *Attorney, Agent, or Firm*—Fay, Sharpe, Fagan, Minnich & McKee, LLP

(57) ABSTRACT

A method to decrease an aldehyde content of a polyester. The method comprises incorporating an effective amount of an additive that is capable of catalyzing a hydride-transfer reaction between an organic donor molecule and an aldehyde in the polyester.

35 Claims, No Drawings

METHOD TO DECREASE THE ALDEHYDE CONTENT OF POLYESTERS

BACKGROUND OF THE INVENTION

Polyesters, especially poly(ethylene terephthalate) (PET) are versatile polymers that enjoy wide applicability as fibers, films, and three-dimensional structures. A particularly important application for PET is for containers, especially for food and beverages. This application has seen enormous growth over the last 20 years, and continues to enjoy increasing popularity. Despite this growth, PET has some fundamental limitations that restrict its application in these markets. One such limitation is its tendency to generate acetaldehyde (AA) when it is melt processed. Because AA is a small molecule, AA generated during melt processing can migrate through the PET. When PET is processed into a container, AA will migrate over time to the interior of the container. Although AA is a naturally occurring flavorant in a number of beverages and food products, in many instances the taste imparted by AA is considered undesirable. For instance, AA will impart a fruity flavor to water, which detracts from the clean taste preferred for this product.

A second limitation in the use of PET for packaging applications is its tendency to become more yellow with increased or more severe processing. This tendency to become more yellow has been associated with the presence of various aldehydes present in the polyester. One such aldehyde is the aforementioned acetaldehyde. A second aldehyde known to promote yellowing in polyesters is 4-carboxybenzaldehyde (4-CBA). 4-CBA is an impurity formed during terephthalic acid manufacture, and while methods exist to decrease the 4-CBA level of terephthalic acid to 25–100 ppm, reducing the 4-CBA content of terephthalic acid below these levels is difficult to achieve. Even at these low concentrations, 4-CBA can adversely affect the color of PET, and is thought to be a contributor to the increased yellowing of PET during recycling or after melt blending with polyamides.

PET is traditionally produced by the transesterification or esterification of a terephthalate precursor (either dimethyl terephthalate or terephthalic acid, respectively) and ethylene glycol, followed by melt polycondensation. If the end use application for the melt-polymerized PET is for food packaging, the PET is then subject to an additional operation known as solid-state polymerization (SSP), where the molecular weight is increased and the AA generated during melt polymerization is removed. A widely used method to convert the SSP PET into containers consists of drying and remelting the PET, injection molding the molten polymer into a container precursor (preform), and subsequently stretch blow-molding the preform into the final container shape.

Historically, the impact of AA on product taste has been minimized by use of low-activity polymerization catalysts to minimize regeneration of AA during injection molding, use of extended solid-state polymerization times to insure complete removal of AA prior to injection molding, and use of low-shear screws and balanced hot-runner systems to minimize AA regeneration during injection molding. Typical preform AA levels for PET preforms produced using these methods are 6–8 ug/g (ppm), which is acceptable for many applications where the taste threshold for AA is sufficiently high, or where the useful life of the container is sufficiently short. For other applications, where the desired shelf-life of the container is longer, the product is more sensitive to off-taste from AA, or the prevailing environmental conditions are warmer, it is not possible to keep the AA level below the taste threshold even by employing these methods. For example, in water the taste threshold is considered to be less than about 40 ug/L (ppb), and often a shelf-life of up to two years is desired. For a PET bottle that contains 600 ml of beverage, a preform AA content of 8 ppm can result in a beverage AA level greater than 40 ppb in as little as one month.

However, even when acceptable AA levels can be achieved using the above-described methods, achieving those AA levels comes at a significant cost. That cost includes the need to carry out a solid-state polymerization step after the melt polymerization of PET, the need for specially designed injection molding equipment, and the need for low-activity polymerization catalysts. In addition, because AA is regenerated during the injection molding process, and the amount generated is critically dependent on the injection molding process conditions, preform manufacturers must continually monitor AA content during container production.

In addition to the afore-mentioned process-related methods, other methods to minimize AA content of polyesters include modification of the polymer itself through the use of lower intrinsic viscosity (IV) resins or the use of lower melting resins. However, lower IV resins produce containers that are less resistant to environmental factors such as stress crack failure. Lower melting resins are achieved by increasing the copolymer content the PET resin, but increasing the copolymer content also increases the natural stretch ratio of the polymer, which translates into decreased productivity in injection molding and blow molding.

Methods to reduce the impact of yellowing from 4-CBA include the aforementioned purification of the terephthalic acid feedstock. Other methods include the addition of toners (especially cobalt salts, or blue and red dyes) to mask the yellowness. However, these approaches also have inherent costs, and do not completely address the issue of increasing yellow discoloration in polyesters with increasing or more severe processing, especially for recycled PET.

Another approach to minimize the AA content of polyesters has been to incorporate additives into the polyester that will selectively react with, or scavenge, the acetaldehyde that is present. Thus Igarashi (U.S. Pat. No. 4,837,115) discloses the use of amine-group terminated polyamides and amine-group containing small molecules as AA scavengers. Igarashi teaches that the amine groups are effective because they can react with AA to form imines, where the amine nitrogen forms a double bond with the AA moiety. Igarashi teaches that essentially any amine is effective. Mills (U.S. Pat. Nos. 5,258,233; 5,650,469; and 5,340,884) and Long (U.S. Pat. No. 5,266,416) disclose the use of various polyamides as AA scavengers, especially low molecular weight polyamides. Turner and Nicely (WO 97/28218) disclose the use of polyesteramides. These polyamides and polyesteramides are believed to react with AA in the manner described by Igarashi. Rule et. al. (U.S. Pat. No. 6,274,212) discloses the use of heteroatom-containing organic additives that can react with acetaldehyde to form unbridged 5- or 6-member rings, with anthranilamide being a preferred organic additive.

While these AA scavengers are effective at reducing the AA content of polyesters, they suffer from their own drawbacks. For example, relatively high loadings of polyamides or polyesteramides are needed to effect significant AA reductions, and very significant yellowing of PET can occur on incorporation of these amine-containing additives. The use of anthranilamide also results in some degree of discoloration of PET. This color formation inherently restricts the use of these additives to packaging where the PET can be tinted to mask the color. However, most PET packages in use today are clear and uncolored.

Another drawback of these approaches for controlling the AA content of PET is related to their mechanism of action in that they all depend on incorporation of an additive that reacts stoichiometrically with acetaldehyde. Consequently, the amount of AA that can be sequestered in a polyester by these additives is inherently limited to the amount of additive incorporated. Moreover, because the reaction between these additives and AA is thermodynamically reversible, the amount of additive incorporated must be substantially greater than the amount of AA to be sequestered. This limitation is especially important if relatively large amounts of AA need to be scavenged from the polyester, such as in polyesters that have been subjected to very severe processing, or in polyesters that have not had their melt-phase AA content reduced via solid-state polymerization.

A final drawback of the additives disclosed in the above references is that, to a greater or lesser degree, they all are extractable, and therefore can themselves affect the taste of food or beverages packaged in containers made from polyesters incorporating these additives.

A different method of decreasing the AA content of polyesters is disclosed by Rule (U.S. Pat. No. 6,569,479) wherein acetaldehyde present in melt-processed PET is oxidized to acetic acid by the action of an active oxidation catalyst and molecular oxygen. While this method is catalytic, and is therefore capable of removing greater than stoichiometric amounts of acetaldehyde, it suffers from the drawback that the active oxidation catalysts useful for this invention are relatively unselective and are themselves active for generating acetaldehyde under melt-processing conditions, thus limiting their effectiveness. Thus, the greatest amount of decrease in the beverage AA content disclosed by this invention is only 32%.

SUMMARY OF THE INVENTION

The present invention provides a method to decrease an aldehyde content of a polyester by incorporating into the polyester an effective amount of an additive that is capable of catalyzing a hydride-transfer reaction between an organic donor molecule and an aldehyde. The hydride transfer reactions contemplated in the invention can be a Meerwein-Ponndorf-Verley, Oppenauer, Cannizzaro, or Tishchenko reaction. Typically, the organic donor molecule will be the same or another aldehyde, or it may be an alcohol or glycol. Exemplary additives are hydrous metal oxides such as hydrous zirconium oxide. The additive can be incorporated into a molten polyester such as poly(ethylene terephthalate) homopolymer or copolymer. In a preferred embodiment, the additive is present in the polyester at a concentration between about 1 and 2000 ppm, more preferably about 10 and 500 ppm. Exemplary additives have a particle size less than about 30 microns, and have a surface area of about 200–500 m²/g. The treated polyester can be advantageously molded into a solid article, such as a container for food or beverage. The invention is similarly directed to articles produced from the inventive method.

DETAILED DESCRIPTION OF THE INVENTION

The present invention relates to a method which substantially decreases the aldehyde content of polyesters, especially polyesters that are made from ethylene glycol and aromatic diacids or diesters. These polyesters are especially prone to contain aldehydes derived from the thermal degradation of the ethylene linkages, or from impurities in the aromatic diacids. The present invention is particularly directed toward PET, but is also applicable to other polyesters that contain aldehydes either as impurities or as reaction byproducts. Examples of other polyesters contemplated by this invention include but are not limited to poly(ethylene naphthalate), poly(cyclohexylenedimethylene terephthalate), poly(ethylene isophthalate), and copolymers of these polyesters.

In the present invention, the aldehydes present in these polyesters are reduced to alcohols by contact with an additive capable of catalyzing a hydride (H$^-$) transfer from an organic donor molecule to the aldehyde. Reactions of this type are known collectively as Meerwein-Ponndorf-Verley, Oppenauer, Cannizzaro, or Tishchenko reactions. In the Meerwein-Ponndorf-Verley and Oppenauer reactions, the hydride donor molecule is an alcohol, while in the Cannizzaro and Tishchenko reactions the hydride donor molecule is the same or another aldehyde. Thus, in the Meerwein-Ponndorf-Verley and Oppenauer reactions, the net effect of the reaction is the reduction of an aldehyde or ketone to an alcohol, with the simultaneous oxidation of a different alcohol to an aldehyde or ketone; while in the Cannizzaro and Tishchenko reactions the net effect is the disproportionation of two aldehyde (or ketone) molecules to an alcohol and an acid, with possible condensation of the alcohol and acid to form an ester. Preferably, the hydride donor molecule is naturally present in the polyester, but it is within the scope of this invention for the hydride donor molecule to be intentionally added.

These hydride-transfer reactions are known to occur both in liquid medium and in the vapor phase. When these reactions occur in a liquid medium, the reaction conditions typically employed involve the use of high loadings of catalyst, long reaction times at elevated temperatures, and use of high concentrations of the reactants. Often, the hydride donor or the hydride acceptor is also the reaction solvent. Although the selectivity for these reactions is high, conversions are often not quantitative, with conversions of 30–90% being typical. The reaction times required to effect sufficient conversion range between 2 and 200 hours. Reaction temperatures are usually between 80 and 300 deg C. In a liquid medium, the preferred catalyst is often an aluminum alkoxide, although a number of other catalysts have been disclosed in the literature. Thus, Mizusaki (U.S. Pat. No. 4,877,909) discloses the use of a hydrous zirconium oxide as a catalyst for the Meerwein-Ponndorf-Verley reaction. Matsushita (U.S. Pat. No. 4,910,177) discloses the use of partially dehydrated metal oxides selected from the group consisting of titanium, tin, iron, aluminum, cerium, and niobium. Heveling (U.S. Pat. No. 6,075,145) discloses the use of a partially dehydrated hydrous zirconium oxide that has been modified by the addition of copper or nickel salts.

When these reactions are conducted in the vapor phase, the reactants are evaporated and passed over a solid catalyst at elevated temperatures. In the case of vapor phase reactions, the catalyst loadings are very high relative to the amount of reactants present at any given time. Temperatures employed range from 100 deg C. to 300 deg C., and conversions are invariably less than quantitative. Suitable catalysts disclosed for the vapor phase reaction are similar to those disclosed above as effective for the liquid phase reaction. Additional catalysts disclosed to be effective for the vapor phase reaction include hydrous hafnium oxide, hydrous vanadium pentoxide, hydrous titanium dioxide, hydrous niobium oxide, and hydrous tantalum oxide (Reichle, U.S. Pat. No. 5,354,915).

While these reactions are effective for the reduction of aldehydes, it is surprising that these hydride-transfer reactions would be effective for the removal of aldehydes from polyesters. For example, compared to the high concentrations of reactants necessary to achieve reasonable conversions in the liquid or vapor phase, aldehydes are present in polyesters at very low concentrations, typically at levels of 1–100 ppm. In contrast to the high loadings of catalyst required for achieving reasonable reaction rates in the liquid or vapor phase, only low concentrations of the hydride-transfer catalyst can be tolerated in a polyester, since catalyst loadings greater than approximately 0.25 wt % may adversely affect other properties of the polyester, such as clarity. Furthermore, because most of the acetaldehyde present in a polyester container sidewall is formed via the room-temperature hydrolysis of vinyl esters and methyl dioxolane, the catalyst must be active at room temperature. Moreover, many of the catalysts employed for these reactions are deactivated by the presence of moisture, whereas moisture is an unavoidable component of polyesters under normal use conditions. Finally, for catalyst to be active at room temperature, it must be active when the polyester is in the solid state, where the diffusional rates for the reactants are many orders of magnitude lower than in the liquid or gas phase.

However, as will be seen in the examples presented below, the hydride-transfer reactions disclosed in the present specification do occur in polyesters at room temperature, even with very low loadings of catalyst and at very low concentrations of aldehydes. That the reaction is so effective under these conditions is both surprising and highly useful, because it provides an efficient method to catalytically decrease the aldehyde content of polyesters.

While not being bound to any particular theory, it is believed that the hydride-transfer reaction of the present invention is much more effective than would be expected because of the nature of the catalyst The catalysts effective for the hydride-transfer reactions of the present invention are heterogeneous catalysts; that is, the catalytic action of these materials is provided by a solid surface where the organization of the atoms at the material's internal surface is critical to the catalytic activity. For example, most of the catalysts disclosed to be effective for the liquid-phase or vapor phase hydride-transfer reaction are insoluble hydrous metal oxides. Even aluminum alkoxides, which might be considered to be soluble catalysts, are believed to function because, under the liquid-phase reaction conditions employed, they are present as polymeric complexes (see, for example, Whittaker, J., J. Am. Chem. Soc. 1969, 91, 394). In the field of heterogeneous catalysis, it is known that the catalytic activity of a surface can be adversely affected by the presence of too much reactant or reaction product; that is, the activity of the catalyst depends on the presence of a substantial number of unoccupied sites on the catalyst surface. In the process of the present invention, the amount of aldehyde present is low enough that the heterogeneous catalyst surface is not fully occupied by the reactants or reaction products, and consequently, the catalytic activity exhibited by these materials is in the present environment far greater than that previously disclosed, where high levels of reactants have been employed.

Organic donor molecules suitable as hydride transfer agents for use in the present invention may be intentionally added to the polyester, or may be naturally present in the polyester. For food-contact applications, it is preferred that the organic donor molecule be naturally present in the polyester. In particular, for removal of acetaldehyde it is preferred that the organic donor molecule is acetaldehyde, and the reaction that occurs is the disproportionation of acetaldehyde to ethanol, acetic acid, and ethyl acetate. As will be seen in the examples below, this appears to be the predominant reaction that occurs in PET containing catalysts of the present invention.

Thus, unlike previous methods to sequester acetaldehyde which depend on preventing the migration of acetaldehyde by binding it to a larger molecule, in the present invention, acetaldehyde is converted catalytically into ethanol, acetic acid, and ethyl acetate. These molecules are of similar molecular weight to acetaldehyde, and consequently are capable of migrating from the polyester into the package interior. However, these molecules all possess taste thresholds that are as much as 1000 times greater than that of acetaldehyde; consequently, migration of these reaction products to the package interior does not pose a taste or odor issue. In addition, these compounds are all generally recognized as safe (GRAS) and are frequently used as direct food additives; therefore they do not pose an issue regarding food safety. Finally, because the catalysts of the present invention are solid, insoluble materials, these additives are largely incapable being extracted from the polymer matrix, and therefore, have no potential to directly impact the taste of products.

Specific catalysts effective for the reduction of aldehydes in polyesters can be selected from those catalysts effective at catalyzing the Meerwein-Ponndorf-Verley, Oppenauer, Cannizzaro or Tishchenko reactions in the liquid or vapor phase. Those catalysts, for example, include the hydrous oxides of magnesium, calcium, strontium, barium, scandium, titanium, vanadium, chromium, manganese, iron, cobalt, nickel, zinc, aluminum, gallium, indium, tin, cadmium, niobium, zirconium, yttrium, hafnium, tantalum, lanthanum, and the rare earths. Because the most effective method for incorporation of these catalysts into a polyester requires adding the catalyst to the molten polymer or polymer precursors, preferred catalysts are ones that are substantially stable to hydrolytic degradation at the temperatures that they will be exposed to. For this reason, aluminum alkoxides are not preferred as catalysts for the reaction of the present invention, because they are substantially decomposed to monomeric aluminates under the conditions required to process high molecular weight polyesters. Similarly, the carboxylates, carbonates, and alkoxides of other metals are not preferred, since they will also readily decompose under the reaction conditions to dissolved monomeric species.

Catalysts effective for the reduction of aldehydes in polyesters also need to exhibit sufficient stability to thermal degradation. For this reason, hydrous aluminum oxides are somewhat less preferred as catalysts, since they are more prone to undergo dehydration to aluminum oxide under the conditions found in the polyester melt. In contrast, the hydrous oxides of zirconium, hafnium, niobium, and tantalum do not exhibit similar propensities for dehydration, and consequently possess substantial activity, even after exposure to the high temperatures found in the molten polyester. Therefore, these hydrous oxides are preferred catalysts for the present invention. Of these, hydrous zirconium oxide is especially preferred due to its low cost, ready availability, and high activity.

Catalysts of the present invention can be employed as single materials, or as physical mixtures of two or more catalytically active materials. In addition, the catalysts employed may be pure substances, or may be deposited on other materials. For example, hydrous zirconium oxide may be used as is, or may be deposited onto a silica or alumina support. Optionally, the activity of the catalysts may be enhanced further by absorbing other materials onto their surfaces. Thus, the activity of hydrous zirconium oxide may be further enhanced by absorbing the oxides of lithium, sodium, potassium, magnesium, calcium, strontium, yttrium, lanthanum, cerium, neodynium, copper, iron or nickel onto its surface. In addition, the hydrous metal oxides may be partially dehydrated to improve their catalytic activity and/or stabilize them against further dehydration when added to a molten polyester. For purposes of the present disclosure, it is to be understood that the term hydrous metal oxides includes partially dehydrated hydrous metal oxides.

Because the additives of the present invention are insoluble, heterogeneous catalysts, the specific surface area, pore radius, and particle size may influence the effectiveness of the catalyst. In general, higher surface areas and greater pore radius will correspond with higher specific activities; therefore, a material that possesses a higher specific surface area and a given pore radius may be preferred over a material with the same nominal chemical composition that possesses a lower specific surface area and the same pore radius. For the hydrous zirconium oxides, increasing calcination temperature correlates with lower specific surface area but higher pore radius; for this reason, partially dehydrated hydrous zirconium oxides calcined at about 300 deg C. possess higher activity than hydrous zirconium oxides calcined at lower or higher temperatures. Typical surface areas for active hydrous zirconium oxides are in the 200–500 $m^2/g$ range, while surface areas for relatively inactive zirconium oxides are in the 2–5 $m^2/g$ range. Similarly, smaller particle sizes correlate with higher activity, since the diffusion path to the catalyst will be less. This is especially true at temperatures below about 80 deg C., where the diffusion of acetaldehyde may be the rate limiting step for reaction. In addition, the smaller the particle size, the less likely will the catalyst affect the processability and clarity of the polyester, and therefore smaller mean particle size materials are preferred relative to larger particle size material of the same chemical composition and specific surface area. In the present invention, high activity is obtained by additives where the average particle size is about 15 microns, while relatively lower effectiveness is obtained by additives where the average particle size is >30 microns. There is no specific lower limit to the preferred particle size, except as dictated by the cost, availability, and processability of the materials.

Because the additives of the present invention are catalytic in their action, the quantity of aldehydes that can be removed from polyesters is not dependent on the amount of additive incorporated. However, for a given additive, higher loadings will result in a higher rate of reaction of the aldehyde. Higher loadings are therefore relatively preferred over lower loadings. The upper limit of the amount of additive to be incorporated is dictated by the rate of aldehyde removal desired, and by the impact of higher loadings on other factors, such as degree of particulate haze, processability, and cost. As will be seen in the examples, loadings of 100–1000 ppm are usually sufficient to achieve the technical effect desired for most applications.

The compositions of the polyesters disclosed in the present invention are not critical, and essentially any monomer or co-monomer can be utilized without adversely affecting the performance of the additives in reducing the aldehyde content. Because of their economic importance, polyesters based on terephthalic acid and ethylene glycol are especially important.

The point of addition of the additives of the present invention is relatively unimportant, as long as they are added prior to forming the final article. However, it is important to maximize the degree of dispersion of the additives within the polyester matrix. For this reason, it is preferred to add these catalysts where sufficient melt mixing can occur. For most applications, it is sufficient to add the catalysts as powders or as dispersions immediately prior to the injection molding process. However, it is possible to add the catalysts before or during the melt-polymerization process. Addition of the catalysts of the present invention early in polymerization process is preferred when removal of aldehydes present as impurities in the raw materials (such as 4-CBA) is desired. Addition of these catalysts at the end of melt-polymerization is preferred when the object is to decrease the time required to remove AA or other aldehydes in the solid-state polymerization process, or when the object is to eliminate the need for a solid-state polymerization process altogether.

The method of incorporation of the disclosed additives into polyesters is not critical. The additives can be dispersed in a solid or liquid carrier, and mixed with the polyester pellets immediately before injection molding. They may also be incorporated by spraying a slurry of the additive onto the polymer pellets prior to drying. They may be incorporated by injection of a dispersion of the additive into pre-melted polyester. They may also be incorporated by making a masterbatch of the additive with the polyester, and then mixing the masterbatch pellets with the polymer pellets at the desired level before drying and injection molding or extrusion. In addition to the use of slurries or dispersions, the additives of the present invention may be incorporated as dry powders.

Because the additives of the present invention are effective at greatly reducing the acetaldehyde content of polyesters, where low AA levels are important they are useful for achieving very low preform and beverage AA levels in polyester containers. However, the additives of the present invention are also useful for enabling the practice of modes of polyester container production that are now precluded because of the issue of acetaldehyde. Thus, the additives of the present invention can enable the use of high-activity melt-polymerization catalysts, which heretofore have been avoided because of the issue of AA. They can also enable the use of higher melting polyesters which have desirable physical properties, but concomitantly higher AA content because of the higher melt-processing temperatures required. They can also enable a revision of the design of injection molding equipment, since careful control of AA can now be less of a design factor. And finally, they can enable totally new methods of manufacturing of polyester containers, such as direct conversion of polyester melts into preforms without prior solidification and AA removal.

EXAMPLES

The following examples illustrate the use of the disclosed additives for decreasing the aldehyde content of polyesters. The examples are provided to more fully describe the invention and are not intended to represent any limitation as to the scope thereof. In these examples, the effectiveness of the additives in reducing the aldehyde content was determined by measuring the AA content of PET in the presence of the additive, relative to the AA content of identically processed PET without the additive. The AA content was determined by taking a representative portion of the melt-processed polyester, grinding it to pass a 20 mesh (850 micron) screen, and desorbing the contained AA from 0.1 grams of the ground polyester by heating at the specified time and temperature in a sealed 20 mL vial. The desorbed AA in the headspace of the vial was then analyzed using a gas chromatograph equipped with a flame ionization detector. Beverage AA levels were determined by removing a 5 gram aliquot of the beverage, placing the aliquot into a 20 mL vial, adding 2.5 grams of sodium chloride, and desorbing the contained AA at 80 deg C. for 30 minutes, followed by analysis of the AA desorbed into the headspace of the vial using a gas chromatograph equipped with a flame ionization detector.

Examples 1–4

In the following examples, amorphous melt-polymerized 0.80 IV PET pellets were dried in a vacuum oven at 80 deg C. for 3 days. After drying, the pellets had a residual moisture content of <50 ppm, and a residual AA content of 24 ppm. To 3 kilograms of the dried resin was added 3 grams of mineral oil and the indicated amount of hydrous zirconium oxide. (The hydrous zirconium oxide used in examples 2–4 had an average particle size of about 15–20 microns.) The additive was dispersed onto the pellets by tumbling, and then the pellets were injection molded into 27 gram preforms using an Arburg unit cavity press. The barrel temperature utilized was 280 deg C., and the cycle time was 30 seconds. The AA content of the molded preforms was measured after heating the ground preform at 150 deg C. for 30 minutes. The results tabulated below demonstrate the effectiveness of the hydrous zirconium oxide at reducing the AA content of PET, even when the PET initially had a very high AA content.

| Example No. | ppm Hydrous Zirconium Oxide | ppm AA | % AA Decrease |
|---|---|---|---|
| 1 | 0 | 42.7 | — |
| 2 | 250 | 23.2 | 45.7 |
| 3 | 500 | 13.2 | 69.1 |
| 4 | 1000 | 8.5 | 80.0 |

The gas chromatographic traces from Examples 1–4 were examined. For Example 1, the only GC peaks observed had the same retention times as acetaldehyde and 2-methyl-1,3-dioxolane. For Examples 2–4, new peaks were observed that were not present in the control, and the GC integration area of the new peaks increased in proportion to the amount of hydrous zirconium oxide added. GC-MS analysis of the gases desorbed into the headspace of the vials confirmed that ethanol, acetic acid, and ethyl acetate were formed in the polyester samples containing hydrous zirconium oxide, but not in the control. This result demonstrates that the hydrous zirconium oxide decreased the acetaldehyde content of the polyester by catalytically converting the acetaldehyde to ethanol, acetic acid, and ethyl acetate, rather than by merely sequestering the acetaldehyde.

Examples 5–8

The impact of the hydrous zirconium oxide on the color of the polyester in examples 1–4 was evaluated by grinding the preforms to a fine powder, and then measuring the $L^*$, $a^*$, and $b^*$ color values using a Hunter color meter.

| Example No. | Ppm Hydrous zirconium Oxide | $L^*$ | $a^*$ | $b^*$ |
|---|---|---|---|---|
| 5 | 0 | 74.37 | −2.41 | 5.70 |
| 6 | 250 | 75.55 | −2.08 | 5.29 |
| 7 | 500 | 73.74 | −2.03 | 5.16 |
| 8 | 1000 | 74.46 | −1.94 | 4.81 |

These results show that the presence of hydrous zirconium oxide actually improves the color of polyesters, in marked contrast to previously disclosed acetaldehyde-reducing additives, which invariably caused an increase in the amount of color (especially yellowness, which is reflected in increased $b^*$ values for polyesters containing those previously disclosed additives).

Examples 9–12

The AA content test using ground preforms from Examples 1–4 above was repeated, except that the ground preforms were held at room temperature (22–24 deg C) for the indicated number of days. The vial headspace was sampled without heating; therefore, the AA content measured was the amount that diffused from the ground polymer at room temperature. The results tabulated below demonstrate that for the control, the amount of AA continues to increase with time, consistent with the continual hydrolysis of methyl dioxolane and vinyl esters in the ground polymer. In contrast, for the ground resins containing hydrous zirconium oxide, the initial amount of AA released is decreased in proportion to the amount of added hydrous zirconium oxide, and the rate of release over time is negligible. These results are consistent with the hydrous zirconium oxide catalytically consuming acetaldehyde at room temperature.

| Example No. | ppm Hydrous Zirconium Oxide | ppm AA (day 3) | Ppm AA (day 10) | ppm AA (day 17) |
|---|---|---|---|---|
| 9 | 0 | 7.94 | 9.05 | 11.36 |
| 10 | 250 | 4.28 | 4.73 | 4.56 |
| 11 | 500 | 2.24 | 2.89 | 2.93 |
| 12 | 1000 | 1.58 | 1.54 | 2.03 |

The gas chromatographic traces from days 3, 10, and 17 for Examples 9–12 were examined. For Example 9, the only GC peaks observed for all three days had the same retention times as acetaldehyde and 2-methyl-1,3-dioxolane. For Examples 10–12, a new peak was observed with the same retention time as ethanol. The integration area of the new peak increased in proportion to the amount of hydrous zirconium oxide added and with time. This result demonstrates that the hydrous zirconium oxide incorporated into PET is catalytically active for converting acetaldehyde to ethanol at room temperature.

Examples 13–16

Preforms from Example 1–4 were blow molded into 20 oz. containers using standard blow molding conditions. Immediately after blow molding, the bottles were filled with carbonated water (containing 4 volumes of $CO_2$), capped, and stored at room temperature. Aliquots were removed at the time intervals specified in the table below and analyzed for beverage AA content.

| Example No. | ppm Hydrous Zirconium Oxide | ppb AA (day 7) | ppb AA (day 14) | ppb AA (day 28) | ppb AA (day 84) |
|---|---|---|---|---|---|
| 13 | 0 | 124.8 | 164.3 | 286.1 | 319.6 |
| 14 | 250 | 66.1 | 106.8 | 163 | 185.2 |
| 15 | 500 | 52.8 | 56.1 | 87.3 | 113.6 |
| 16 | 1000 | 39.6 | 42.1 | 60.0 | 41.1 |

These results demonstrate that use of the catalyst of the present invention also results in markedly lower beverage AA levels. This observation is particularly important, since this result demonstrates that catalysts of the present invention are active at room temperature even in the presence of carbon dioxide and water.

Examples 17–22

In the following examples, crystallized, solid-state polymerized 0.84 IV PET pellets were dried overnight at 150 deg C. After drying, the pellets had a residual moisture content of <50 ppm, and a residual AA content of <1 ppm. To 3 kilograms of the dried resin was added 3 grams of mineral oil and the indicated amount of hydrous metal oxide. All of the hydrous metal oxides utilized in Examples 18–22 had an average particle size of approximately 1–2 microns. The additives were dispersed onto the pellets by tumbling, and then the pellets were injection molded into 27 gram preforms using a Husky unit cavity press. The barrel temperature utilized was 270 deg C., and the cycle time was 30 seconds. The AA content of the molded preforms were measured after heating the ground preform at 150 deg C. for 30 minutes. The results tabulated below demonstrate the activity of the hydrous oxides of other metals for catalyzing the reduction of acetaldehyde in PET via a hydride-transfer reaction.

| Example No. | Hydrous Metal Oxide | ppm Hydrous Metal Oxide | Preform AA | % AA Decrease |
|---|---|---|---|---|
| 17 | — | 0 | 22.48 | 0 |
| 18 | $Ta_2O_5 \cdot xH_2O$ | 500 | 16.64 | 26.0 |
| 19 | $In_2O_3 \cdot xH_2O$ | 500 | 17.60 | 21.7 |
| 20 | $Al_2O_3 \cdot xH_2O$ | 500 | 13.92 | 38.1 |
| 21 | $Nb_2O_5 \cdot xH_2O$ | 500 | 22.23 | <1 |
| 22 | $ZrO_2 \cdot xH_2O$ | 500 | 8.29 | 63.1 |

Example 23

In the following example, crystallized, solid-state polymerized 0.84 IV PET pellets were dried overnight at 150 deg C. After drying, the pellets had a residual moisture content of <50 ppm, and a residual AA content of <1 ppm. To 3 kilograms of the dried resin was added 3 grams of mineral oil and the indicated amount of hydrous zirconium oxide. The pellets were then melt extruded at 280 deg C, and the extrudate quenched in a water bath and chopped to form pellets. The amorphous pellets were crystallized at 160 deg C. for two hours, and were then subjected to solid-state polymerization at 200 deg C. The AA content of the pellets were measured before crystallization, after crystallization, and once an hour during solid-state polymerization. The AA content of the pellets with and without added hydrous zirconium oxide are tabulated below:

| Processing Step | AA Content of PET Control (ppm) | AA Content of PET with 500 ppm Hydrous Zirconium Oxide (ppm) |
|---|---|---|
| Amorphous Pellets | 5.69 | 1.19 |
| Crystallized Pellets | 2.05 | 0.24 |
| 1 hour SSP | 1.64 | 0.26 |
| 2 hours SSP | 1.37 | 0.19 |
| 3 hours SSP | 0.83 | 0.18 |
| 4 hours SSP | 0.53 | 0.28 |
| 5 hours SSP | 0.46 | 0.29 |
| 6 hours SSP | 0.37 | 0.33 |

As can be seen from this example, the addition of a catalyst of the present invention to molten PET greatly reduced the initial AA content of the melt-processed polymer. In addition, further reductions in AA content of the polymer to levels less than 0.4 ppm were achieved much more rapidly and under much milder conditions than were possible in the absence of the added catalyst.

COMPARATIVE EXAMPLES

The importance of the structural nature of the hydride-transfer catalyst was tested by evaluating the effectiveness of different compounds for reducing the AA content of melt-processed PET.

Comparative Examples 1–13

In the following comparative examples, crystalline, solid-state polymerized 0.84 IV PET pellets were dried overnight in a vacuum oven at 150 deg C. After drying, the pellets had a residual moisture content of <50 ppm, and a residual AA content of <1 ppm. To 3 kilograms of the dried resin was added 3 grams of mineral oil and the indicated amount of the specified zirconium compound. The additives were dispersed onto the pellets by tumbling, and then the pellets were injection molded into 27 gram preforms using a Husky unit cavity press. The barrel temperature utilized was 270 deg C., and the cycle time was 30 seconds. The AA content of the molded preforms was measured after heating the ground preform at 150 deg C. for 30 minutes. The results tabulated below demonstrate that soluble zirconium compounds such as zirconium 2-ethylhexanoate, zirconium acetate, zirconium benzoate, zirconium carbonate, and zirconium tartrate are not effective catalysts for the hydride-transfer reaction disclosed in the present invention.

| Comparative Example no. | Additive name | ppm Additive | ppm preform AA | % AA Decrease |
|---|---|---|---|---|
| 1 | — | 0 | 12.65 | 0 |
| 2 | Zirconium 2-ethylhexanoate | 100 | 11.78 | 6.9 |
| 3 | Zirconium 2-ethylhexanoate | 250 | 39.07 | — |
| 4 | Zirconium 2-ethylhexanoate | 500 | 44.84 | — |
| 5 | Zirconium 2-ethylhexanoate | 1000 | 50.95 | — |
| 6 | Zirconium acetate | 500 | 13.22 | — |
| 7 | " | 1000 | 11.58 | 8.4 |
| 8 | Zirconium benzoate | 500 | 14.65 | — |
| 9 | " | 1000 | 10.96 | 13.3 |
| 10 | Zirconium tartrate | 500 | 15.23 | — |
| 11 | " | 1000 | 13.62 | — |

-continued

| Comparative Example no. | Additive name | ppm Additive | ppm preform AA | % AA Decrease |
|---|---|---|---|---|
| 12 | Zirconium carbonate | 500 | 13.43 | — |
| 13 | " | 1000 | 13.84 | — |

The GC traces for the Comparative Examples 1–13 were examined for the presence of peaks with retention times corresponding to ethanol, acetic acid, or ethyl acetate. In no case were these peaks observed.

Comparative Examples 14–16

In the following comparative examples, crystalline, solid-state polymerized 0.84 IV PET pellets were dried overnight in a vacuum oven at 150 deg C. After drying, the pellets had a residual moisture content of <50 ppm, and a residual AA content of <1 ppm. To 3 kilograms of the dried resin was added 3 grams of mineral oil and the indicated amount of aluminum isopropoxide, a catalyst active for the Meerwein-Pondorf-Verley reaction in the liquid phase at low temperature, but that would be expected to decompose to monomeric aluminate species under the melt-processing conditions employed for polyesters. The additive was dispersed onto the pellets by tumbling, and then the pellets were melted and extruded. The barrel temperature utilized was 270 deg C., with a residence time of 90 seconds. The AA content of the extrudate was measured after heating the ground extrudate at 150 deg C. for 30 minutes. The results tabulated below demonstrate that compounds capable of dissolving under the melt-processing conditions employed for polyesters are not effective catalysts for the hydride-transfer reaction disclosed in the present invention.

| Comparative Example no. | Additive name | Ppm Additive | ppm preform AA | % AA Decrease |
|---|---|---|---|---|
| 14 | — | 0 | 3.74 | 0 |
| 15 | Aluminum isopropoxide | 50 | 4.81 | — |
| 16 | Aluminum isopropoxide | 200 | 6.05 | — |

The invention has been described with reference to a preferred embodiment. Modifications and alternatives will be apparent to the skilled artisan upon reading and understanding the preceding detailed description. It is intended that the invention be construed as including all such modifications and alternatives that fall within the scope of the appended claims or equivalents thereof.

I claim:

1. A method to decrease an aldehyde content of a polyester that comprises incorporating into the molten polyester an effective amount of an additive that is capable of catalyzing a hydride-transfer reaction between an organic donor molecule and said aldehyde, said additive being disposed substantially throughout said polyester.

2. The method of claim 1, wherein the hydride transfer reaction is between an alcohol and said aldehyde.

3. The method of claim 1, wherein the hydride transfer reaction is between an aldehyde or ketone and said aldehyde.

4. The method of claim 1, wherein the additive is a hydrous metal oxide.

5. The method of claim 4, wherein the additive is a hydrous zirconium oxide.

6. The method of claim 1, wherein the polyester is a poly(ethylene terephthalate) homopolymer or copolymer.

7. The method of claim 1, wherein the additive is present in the polyester at a concentration between about 1 and 2000 ppm.

8. The method of claim 1, wherein the additive is present in the polyester at a concentration between about 10 and 500 ppm.

9. The method of claim 1, wherein the additive has a particle size less than about 30 microns.

10. The method of claim 1, wherein the additive has a particle size less than about 5 microns.

11. The method of claim 1, wherein the polyester is molded in a solid article.

12. The method of claim 11, wherein the solid article is a container.

13. The method of claim 1, wherein the additive has a surface area of about 200–500 $m^2/g$.

14. The method of claim 1, wherein the organic donor molecule is naturally present in the polyester.

15. The method of claim 1, wherein the additive is a hydrous metal oxide further comprising lithium, sodium, potassium, rubidium, magnesium, calcium, strontium, yttrium, lanthanum, cerium, neodymium, nickel, copper, aluminum or iron ions.

16. A method of forming a polyester container for storing food or beverage comprising combining an additive selected from hydrous metal oxides and a molten poly(ethylene terephthalate) homopolymer or copolymer to form a treated material and molding said treated material to form said container.

17. The method of claim 16, wherein said additive is a hydrous zirconium oxide.

18. A The method of claim 16, wherein said additive is present in the poly(ethylene terephthalate) at a concentration between about 10 and 2000 ppm.

19. A polyester composition having an improved flavor retaining property, comprised of dicarboxylic acid units and diol units, and including an additive selected from hydrous zirconium oxide, hydrous niobium oxide, hydrous tantalum oxide, hydrous tin oxide, hydrous aluminum oxide, and hydrous titanium oxide, said additive being present at a concentration between about 10 and 2000 ppm.

20. A container for food or beverage products, the container being comprised of a polyester including an additive, said additive being selected from hydrous zirconium oxide, hydrous niobium oxide, hydrous aluminum oxide, and hydrous tantalum oxide, and being present at a concentration between about 10 and 2000 ppm.

21. The polyester composition of claim 19 including hydrous zirconium oxide.

22. The polyester composition of claim 19 wherein the additive is present in the polyester at a concentration between 2 and 2000 ppm.

23. The method of claim 19, wherein the additive is present in the polyester at a concentration between about 10 and 500 ppm.

24. The method of claim 19, wherein the additive has a particle size less than about 30 microns.

25. The method of claim 19, wherein the additive has a particle size less than about 5 microns.

26. The method of claim 19, wherein the additive has a surface area of about 200–500 $m^2/g$.

27. The method of claim 19, wherein the additive is a hydrous metal oxide further comprising lithium, sodium, potassium, rubidium, magnesium, calcium, strontium, yttrium, lanthanum, cerium, neodymium, nickel, copper, aluminum or iron ions.

28. The polyester composition of claim 20 including hydrous zirconium oxide.

29. The polyester composition of claim 20, wherein the additive is present in the polyester at a concentration between 2 and 2000 ppm.

30. The method of claim 20, wherein the additive is present in the polyester at a concentration between about 10 and 500 ppm.

31. The method of claim 20, wherein the additive has a particle size less than about 30 microns.

32. The method of claim 20, wherein the additive has a particle size less than about 5 microns.

33. The method of claim 20, wherein the additive has a surface area of about 200–500 m$^2$/g.

34. The method of claim 20, wherein the additive is a hydrous metal oxide further comprising lithium, sodium, potassium, rubidium, magnesium, calcium, strontium, yttrium, lanthanum, cerium, neodymium, nickel, copper, aluminum or iron ions.

35. The method of claim 4, wherein the additive is a hydrous aluminum oxide.

* * * * *